July 28, 1942.   W. D. OSBORN   2,291,253
COUPLING AND UNIVERSAL JOINT FOR FLEXIBLE RODS
Original Filed May 22, 1939
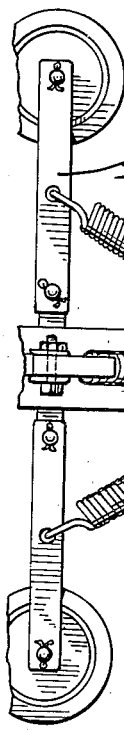
Fig.1.
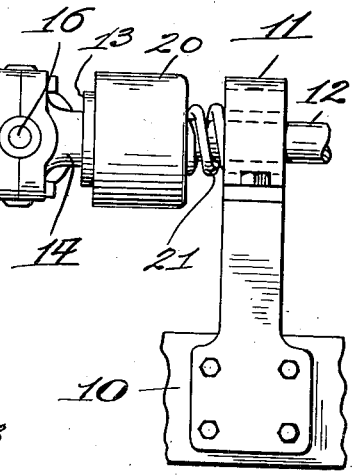
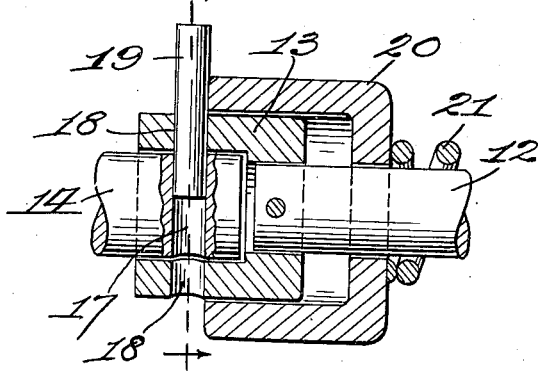
Fig.3.   Fig.2.
INVENTOR.
WILLIAM D. OSBORN
BY
ATTORNEY.

Patented July 28, 1942

2,291,253

UNITED STATES PATENT OFFICE 2,291,253

COUPLING AND UNIVERSAL JOINT FOR FLEXIBLE RODS

William D. Osborn, Los Angeles, Calif.

Original application May 22, 1939, Serial No. 275,126, now Patent No. 2,225,129, dated December 17, 1940. Divided and this application September 12, 1940, Serial No. 356,407

1 Claim. (Cl. 287—104)

My invention relates to a coupling and universal joint for rods and particularly for the flexible rods that extend into sewers, pipe lines, and the like, especially those lines or ducts that are located beneath the ground and which flexible rods are connected to tools that are moved through the ducts for the purpose of loosening and removing accumulations therefrom.

It is the general practice to utilize various tools for loosening and cleaning out the accumulations from sewers, pipe lines, and the like, such tools being connected to flexible rods that extend through the ducts and said rods being rotated by a power driven truck that moves over the ground or roadway, with the flexible rod extending downwardly into a manhole and thence lengthwise through the duct or sewer that is being cleaned, and it is the principal object of my invention to provide simple and efficient means for coupling the flexible rod to a power driven shaft of the motor truck and said coupling means including a universal joint that enables the flexible tool driving rod to be effectively operated even though said rod is not in axial alignment with the power driven rod driving shaft.

The invention herein disclosed is a division of the subject matter set forth in my co-pending application for U. S. Letters Patent on Sewer cleaning tool power plant, filed May 22, 1939, Serial No. 275,126, now Patent No. 2,225,129 dated December 17, 1940.

With the foregoing and other objects in view, my invention consists in certain novel features of construction and arrangement of parts that will be hereinafter more fully described and claimed and illustrated in the accompanying drawing in which:

Fig. 1 is an elevational view with parts in section of my improved coupling and showing the same associated with a power driven shaft and a tool carrying flexible rod.

Fig. 2 is a longitudinal section taken through one end of the coupling.

Fig. 3 is a cross section taken on the line 3—3 of Fig. 2.

Referring by numerals to the accompanying drawing which illustrates a preferred embodiment of my invention, 10 designates a portion of the frame of a mobile power driven truck and mounted on said frame are bearings such as 11 for a horizontally disposed shaft 12, the latter being preferably driven from the same motor that imparts movement to the truck.

Secured in any suitable manner to the driving shaft 12 is a socket 13 that is adapted to receive one end of the body of the coupling. The socket bottom is flat and is perpendicular to the shaft axis. This coupling is preferably formed of two short shanks 14 and 15 that are connected by a conventional universal joint 16. The end portion of coupling member 14 is provided with a diametrically arranged aperture 17 which when said coupling member is inserted in socket 13 coincides with apertures 18 that are formed through the wall of said socket. The aligned apertures 17 and 18 are adapted to receive a coupling pin 19, the length of which is equal to the external diameter of socket 13.

Mounted for sliding movement on driving shaft 12 adjacent socket 13 is a flat-bottomed housing 20 that normally covers said socket and which housing is yieldingly forced toward said socket by an expansive coil spring 21 that is mounted on shaft 12 between said housing and the bearing 11. The housing is complemental in shape to the socket 13.

When housing 20 is in its normal position, the annular wall of said housing overlies the ends of the coupling pin 19, thus holding the same in position so as to couple or connect socket 13 and shank 14.

Suitably secured to the outer end of shaft 15 is a socket 22 practically identical in construction with the socket 13 and formed in the annular wall of said socket at diametrically opposite points are apertures 23. Normally covering socket 22 is a cup-shaped housing 24 that is mounted to slide freely on the reduced end portion 25 of shank 15 and said housing being yieldingly maintained in position upon the socket by an expansive coil spring 26 that is positioned on the reduced portion 25 of the shank between said housing and a shoulder 27 that is formed between the main body of the shank and the reduced portion 25.

Socket 22 is adapted to receive one end of the flexible rod 28 that enters the sewer pipe or other duct that is to be cleaned, which flexible rod may carry a tool T designed to scrape and clean the inner surface of the sewer pipe or duct.

Formed through the end of the flexible rod 28 that enters socket 22 is a diametrically arranged aperture 29 that is adapted to register with the apertures 23 in socket 22 and said registering apertures receive a removable pin 30 that provides a readily releasable connection between the end of the flexible rod and the socket 22.

When the improved coupling and universal joint is in service, the housings 20 and 24 under the influence of springs 21 and 26 respectively cover the sockets 13 and 22 respectively and the ends of the coupling pins 19 and 30, thereby preventing said pins from becoming detached from the respective sockets and the flexible rod and shank that occupy said sockets.

To disconnect the flexible rod 28 from the coupling, it is only necessary to move the housing 24 lengthwise upon the reduced portion of shank 25 against the resistance of spring 26 until the ends of the pin 30 are uncovered and said pin may now be removed from the end of the flexible rod and the socket 22, thus enabling the rod to be readily detached from said socket.

To disconnect the coupling and universal joint from the driving shaft 12, housing 20 is moved on said shaft against the resistance of spring 21 until the ends of pin 19 are uncovered and after said pin has been removed, the end of shank 14 may be readily disengaged from socket 13.

In the event that the flexible rod and the tool carried thereby are being utilized in a sewer or duct that is in longitudinal alignment with the driving shaft 12, the coupling comprising the shanks 14, 15, and universal joint 16, may be dispensed with and the end of the flexible rod 28 connected directly to the socket 13 that is carried by the end of the driving shaft 12.

Generally the motor truck that operates the flexible rod and tool carried thereby traverses the roadway or surface of the ground several feet above the sewer or other duct that is being cleaned and under such conditions the universal joint 16 in the coupling enables the shank 15 to operate at an angle relative to the axis of the shank 14 while rotary motion of the driving shaft 12 is being imparted to flexible rod 28 and the tool or tools carried thereby.

Thus it will be seen that I have provided a coupling and universal joint for flexible rods that is relatively simple in construction, inexpensive of manufacture and very effective in performing the functions for which it is intended.

It will be understood that minor changes in the size, form and construction of the various parts of my improved coupling and universal joint for flexible rods, may be made and substituted for those herein shown and described, without departing from the spirit of my invention, the scope of which is set forth in the appended claim.

I claim as my invention:

A coupling comprising a driving shaft, a substantially cylindrical socket fixed on one end thereof and having a flat bottom whereof the outer wall is flat and perpendicular to the shaft axis, a driven rod having one end inserted in said socket out of contact with the adjacent end of the shaft, said socket and rod having registering apertures, a connecting pin removably positioned in said apertures, a housing complemental in shape to said socket and being freely slidable on and axially of the shaft to enclose said socket and pin, said housing having a flat bottom adapted to contact the flat outer bottom wall of the socket to limit movement of the housing over said socket in the direction of said driven rod, and an expansion spring mounted on the shaft and bearing against the flat bottom of the housing to normally urge said housing fully over the socket and in contact against the flat outer bottom wall thereof.

WILLIAM D. OSBORN.